(12) United States Patent
Matsushita

(10) Patent No.: US 9,862,815 B2
(45) Date of Patent: Jan. 9, 2018

(54) RUBBER COMPOSITION AND METHOD OF PRODUCING SAME, AND TIRE

(75) Inventor: Junko Matsushita, Tokyo (JP)

(73) Assignee: BRIDGESTONE CORPORATION, Chuo-Ku, Tokyo (JP)

( * ) Notice: Subject to any disclaimer, the term of this patent is extended or adjusted under 35 U.S.C. 154(b) by 546 days.

(21) Appl. No.: 13/877,071

(22) PCT Filed: Sep. 30, 2011

(86) PCT No.: PCT/JP2011/072661
§ 371 (c)(1),
(2), (4) Date: Jun. 7, 2013

(87) PCT Pub. No.: WO2012/043829
PCT Pub. Date: Apr. 5, 2012

(65) Prior Publication Data
US 2013/0274375 A1    Oct. 17, 2013

(30) Foreign Application Priority Data

Oct. 1, 2010  (JP) .................................. 2010-224353
Oct. 1, 2010  (JP) .................................. 2010-224354

(51) Int. Cl.
*C08L 9/00*      (2006.01)
*B60C 1/00*      (2006.01)
*C08L 7/00*      (2006.01)

(52) U.S. Cl.
CPC ................. *C08L 9/00* (2013.01); *B60C 1/00* (2013.01); *B60C 1/0016* (2013.01); *B60C 1/0025* (2013.01); *C08L 7/00* (2013.01)

(58) Field of Classification Search
CPC combination set(s) only.
See application file for complete search history.

(56) References Cited

U.S. PATENT DOCUMENTS

| | | |
|---|---|---|
| 5,585,440 A | 12/1996 | Yamada et al. |
| 5,859,101 A | 1/1999 | Kikkawa et al. |
| 6,232,404 B1 * | 5/2001 | Sandstrom et al. .......... 525/197 |
| 2006/0063878 A1 | 3/2006 | Sandstrom et al. |
| 2010/0032078 A1 * | 2/2010 | Miyazaki ............ B29C 35/0288 156/110.1 |
| 2010/0160530 A1 | 6/2010 | Kurazumi et al. |
| 2010/0222502 A1 * | 9/2010 | Tanaka et al. ................ 524/588 |

FOREIGN PATENT DOCUMENTS

| | | | |
|---|---|---|---|
| CN | 1322772 A | 11/2001 | |
| CN | 101283024 A | 10/2008 | |
| CN | 101370867 A | 2/2009 | |
| EP | 1975200 A1 | 10/2008 | |
| EP | 2258765 A1 | 12/2010 | |
| EP | 2581391 A1 | 4/2013 | |
| EP | 2554553 A1 | 6/2013 | |
| GB | 672992 A * | 5/1952 | ............... C08L 9/00 |
| JP | 61-215640 A | 9/1986 | |
| JP | 06-190083 A | 7/1994 | |
| JP | 2000-212213 A | 8/2000 | |
| JP | 2001-139633 A | 5/2001 | |
| JP | 2002-241407 A | 8/2002 | |
| JP | 2006-097024 A | 4/2006 | |
| WO | WO 03037974 A2 * | 5/2003 | ............... B60C 1/00 |
| WO | 2007/040252 A1 | 4/2007 | |

OTHER PUBLICATIONS

Extended European Search Report issued by the European Patent Office in Application No. 11829382.8 dated Feb. 28, 2014.
Office Action dated Jun. 17, 2015 in corresponding Chinese Patent Application No. 201180052638.4.

* cited by examiner

*Primary Examiner* — Nicole Buie-Hatcher
(74) *Attorney, Agent, or Firm* — Sughrue Mion, PLLC

(57) ABSTRACT

The present invention provides a rubber composition that comprises a rubber component containing a polybutadiene and a dienic rubber or an olefinic rubber immiscible with the polybutadiene, and a filler, in which the Mooney viscosity ($ML_{1+4}/100°$ C.) of the polybutadiene referred to as ML(I), and the Mooney viscosity ($ML_{1+4}/100°$ C.) of the dienic rubber or the olefinic rubber immiscible with the polybutadiene referred to as ML(II) are in a relation of $ML(I) \geq ML(II)$, a method for producing the rubber composition and a tire using the rubber composition. The rubber composition is excellent in fracture resistance and capable of attaining good workability not lowering the durability such as abrasion resistance and the like of tires, and can reduce the rolling resistance of tires.

13 Claims, No Drawings

RUBBER COMPOSITION AND METHOD OF PRODUCING SAME, AND TIRE

CROSS REFERENCE TO RELATED APPLICATIONS

This application is a National Stage of International Application No. PCT/JP2011/072661 filed Sep. 30, 2011, claiming priority based on Japanese Patent Application Nos. 2010-224354 filed Oct. 1, 2010 and 2010-224353 filed Oct. 1, 2010, the contents of all of which are incorporated herein by reference in their entirety.

TECHNICAL FIELD

The present invention relates to a rubber composition and its production method and to a tire using the rubber composition, and precisely relates to a rubber composition applicable to predetermined sites of automobile tires to improve the fuel efficiency of tires and to impart sufficient abrasion resistance and fracture characteristics to tires, and also impart thereto good grip performance, and relates to a method for producing the rubber composition and to a tire using the rubber composition.

BACKGROUND ART

Recently, with the social demand for energy saving, it is strongly desired for automobiles to reduce heat generation by rubber for tires and to reduce fuel consumption. Accordingly, as the rubber composition for use for treads and others of tires, desired is a rubber composition having a low tan δ (hereinafter this may be referred to as "low-loss property") and excellent in low heat generation. Further, the rubber composition for treads is desired to be excellent in abrasion resistance, fracture characteristics and grip performance in addition to the-loss property thereof, from the viewpoint of safety and economic efficiency.

Against the problems, heretofore it is known that, when a terminal modifying group is introduced into a polybutadiene used in a rubber composition, then the modifying group may react with the filler in the composition to improve the affinity of the rubber component with the filler, whereby the amount of bound rubber increases and, as a result, the abrasion resistance of the rubber composition is thereby enhanced (for example, see Patent Reference 1).

However, the rubber composition of the time could attain sufficient abrasion resistance but involves some problems in that such an expensive modified polymer must be used and the workability of the composition worsens.

CITATION LIST

Patent Reference

Patent Reference 1: WO2006/112450

SUMMARY OF THE INVENTION

Problems that the Invention is to Solve

The present invention has been made in consideration of the situation as above, and its object is to provide a rubber composition excellent in fracture resistance and capable of attaining good workability not lowering the durability such as abrasion resistance and the like of tires, and a method for producing the rubber composition, and also to provide a tire using the rubber composition.

Means for Solving the Problems

The present inventors have assiduously studied for the purpose of attaining the above-mentioned object and, as a result, have found that, in a blend system of polybutadiene and a rubber immiscible with the polybutadiene, when the specific viscosity of the polybutadiene is comparable with or higher than that of the immiscible rubber, then the torque to be given to the polybutadiene during kneading can be increased (or that is, the kneading efficiency of the polybutadiene can be increased), and the amount of the polybutadiene bound rubber can be thereby increased, and when the rubber composition of the type is sued as a tire member, then it is possible to provide a rubber composition excellent in fracture resistance and capable of attaining good workability not worsening the durability such as abrasion resistance or the like of the rubber composition, and have completed the present invention.

Specifically, the present invention provides the following:

[1] A rubber composition which comprises a rubber component containing a polybutadiene and a dienic rubber or an olefinic rubber immiscible with the polybutadiene, and a filler, and in which the Mooney viscosity ($ML_{1+4}/100°$ C.) of the polybutadiene referred to as ML(I), and the Mooney viscosity ($ML_{1+4}/100°$ C.) of the dienic rubber or the olefinic rubber immiscible with the polybutadiene referred to as ML(II) are in a relation of ML(I)≥ML(II);

[2] The rubber composition according to [1], wherein the polybutadiene is one processed to have an increased molecular weight through coupling treatment;

[3] The rubber composition according to [1] or [2], wherein the dienic rubber immiscible with the polybutadiene is a natural rubber or a polyisoprene rubber;

[4] The rubber composition according to any of [1] to [3], wherein the content mass ratio (A/B) of the content mass A of the polybutadiene to the content mass B of the dienic rubber or the olefinic rubber immiscible with the polybutadiene falls within a range of from 40/60 to 60/40;

[5] The rubber composition according to any of [1] to [4], wherein the polybutadiene is a modified polybutadiene;

[6] The rubber composition according to any of [1] to [5], wherein the content of the filler is from 30 parts by mass to 70 parts by mass per 100 parts by mass of the rubber component;

[7] The rubber composition according to any of [1] to [6], wherein the filler is at least one selected from carbon black and an inorganic filler;

[8] The rubber composition according to any of [5] to [7], wherein the modified polybutadiene is modified with a functional group having an affinity for at least one selected from carbon black and an inorganic filler;

[9] The rubber composition according to any of [1] to [8], wherein the 1,2-vinyl bond content in the polybutadiene is at most 20%;

[10] A tire using the rubber composition of any of [1] to [9];

[11] A method for producing the rubber composition of any of [1] to [9], which comprises a step of kneading a rubber component containing a polybutadiene and a dienic rubber or an olefinic rubber immiscible with the polybutadiene, and a filler, and in which the polybutadiene to be used is one having a Mooney viscosity ($ML_{1+4}/100°$ C.) not smaller than that of the dienic rubber or the olefinic rubber immiscible with the polybutadiene;

[12] The method for producing the rubber composition according to [11], wherein the polybutadiene is a modified polybutadiene;

[13] The method for producing the rubber composition according to [11] or [12], wherein the Mooney viscosity ($ML_{1+4}/100°$ C.) of the dienic rubber or the olefinic rubber immiscible with the polybutadiene is from 45 to 75; and

[14] The rubber composition according to any of claims 5 to 7, wherein the modified polybutadiene is modified with a functional group having an affinity for at least one selected from carbon black and an inorganic filler.

Advantage of the Invention

According to the present invention, there are provided a rubber composition excellent in fracture resistance and capable of attaining good workability not lowering the durability such as abrasion resistance and the like of tires, and a method for producing the rubber composition, and also a tire using the rubber composition.

Further, by using a modified polybutadiene as the polybutadiene therein, there are provided a rubber composition excellent in fracture resistance and capable of reducing the rolling resistance of tires not lowering the durability such as abrasion resistance and the like of tires, and a method for producing the rubber composition, and also a tire using the rubber composition.

Mode for Carrying Out the Invention

The invention is described with reference to its embodiments hereinunder.

<Rubber Composition and Method for Producing Same>

The rubber composition of this embodiment comprises a rubber component containing a polybutadiene and a dienic rubber or an olefinic rubber immiscible with the polybutadiene, and a filler, and in which the Mooney viscosity ($ML_{1+4}/100°$ C.) of the polybutadiene referred to as ML(I), and the Mooney viscosity ($ML_{1+4}/100°$ C.) of the dienic rubber or the olefinic rubber immiscible with the polybutadiene referred to as ML(II) are in a relation of ML(I)≥ML(II).

Preferably, the rubber composition of this embodiment uses a modified polybutadiene as the polybutadiene therein. Here, the modified polybutadiene means one prepared by reacting a predetermined modifying agent with the active terminal or the like of the polybutadiene having an active terminal or the like to thereby introduce various functional groups into the active terminal and the like, and one prepared by introducing various functional groups into the polymerization initiation terminal of polybutadiene. The active terminal and the like encompass both at the active terminal and in the main chain; and the wording "in the main chain" encompasses both inside the main chain and the side chain in the main chain.

In blending a polybutadiene and a rubber immiscible with the polybutadiene, such as a natural rubber or the like, the present inventors investigated the relationship between the viscosity characteristics and the physical properties of the ingredients to be blended and, as a result, have found that, when a blend system with an immiscible rubber has a high Mooney viscosity before kneading, then a bound rubber (carbon gel to be formed in kneading rubber and carbon black) is readily formed, and when the bound rubber amount of polybutadiene is larger, then the abrasion resistance of the rubber composition can be enhanced more.

Further, the present inventors have also found that, when a torque is effectively imparted to the modified polybutadiene part during kneading, then the filler dispersion effect through the modification can be enhanced more.

Accordingly, when the Mooney viscosity of polybutadiene is made higher than the Mooney viscosity of the polymer immiscible with the polybutadiene by any method, then the bound amount of polybutadiene can be increased after kneading, and therefore both the durability and the good workability of the rubber composition can be satisfied. Specifically, by increasing the kneading efficiency of the polybutadiene part, the amount of bound rubber of the polybutadiene part increases and the abrasion resistance of the rubber composition is thereby noticeably enhanced.

On the other hand, the workability of the dienic rubber and the like immiscible with polybutadiene can be enhanced by lowering the Mooney viscosity thereof relative to polybutadiene, and the reinforcing performance of the polybutadiene part can be thereby enhanced not having any significant influence on the entire characteristics of the rubber composition. For these reasons, in this embodiment, the rubber composition satisfies both good abrasion resistance and good fracture resistance.

It is considered that, by making the Mooney viscosity of the polybutadiene relatively higher, the polybutadiene of the polymer components mixed by kneading may have a higher viscosity and may be more readily given the torque imparted thereto, and the amount of the bound rubber of polybutadiene can be thereby increased.

(Rubber Component)

—Polybutadiene—

The polybutadiene for use in this embodiment preferably has a 1,2-vinyl bond amount of at most 20%, more preferably at most 5%. This is because, when the 1,2-vinyl bond amount is at most 20%, then the glass transition temperature is low and the rubber is excellent in impact resilience, abrasion resistance and low-temperature characteristics, and enhances the low-heat-generating property of tires (low hysteresis-loss property).

As described above, the modified polybutadiene favorably used in this embodiment is one prepared by introducing a functional group into the active terminal or the like of polybutadiene. Preferably, the modified polybutadiene is one modified with a functional group having an affinity for at least one selected from carbon black and an inorganic filler. Here the wording "having an affinity for filler" means that the functional group can undergo physical bonding or chemical bonding to the filler. More preferably, the functional group is one selected from a group consisting of a nitrogen-containing functional group, a silicon-containing functional group, an oxygen or sulfur-containing functional group, and a metal-containing functional group. The modified polybutadiene may have the functional group at the terminal or in the main chain thereof.

The nitrogen-containing functional group is any of a substituted or unsubstituted amino group, an amide residue, an isocyanate group, an imidazolyl group, an indolyl group, a nitrile group, a pyridyl group, and a ketimine group. The substituted or unsubstituted amino group includes a primary alkylamine, a secondary alkylamine or a cyclic amine, and an amino group derived from a substituted or unsubstituted imine.

The silicon-containing functional group is preferably an organic silyl or siloxy group, and more precisely, the functional group may be selected from an alkoxysilyl group, an alkylhalosilyl group, a siloxy group, an alkylaminosilyl group, and an alkoxyhalosilyl group.

The oxygen or sulfur-containing functional group includes those selected from a hydroxyl group, a carboxyl group, an epoxy group, a glycidoxy group, a diglycidylamino group, a cyclic dithiane-derived functional group, an ester group, an aldehyde group, an alkoxy group, a ketone group, a thiocarboxyl group, a thioepoxy group, a thioglycidoxy group, a thiodiglycidylamino group, a thioester group, a thioaldehyde group, a thioalkoxy group and a thioketone group. The alkoxy group may be an alcohol-derived alkoxy group derived from a benzophenone.

The method for producing the polybutadiene for use in this embodiment is not specifically defined. Employable is any of a solution polymerization method, a vapor-phase polymerization method or a bulk polymerization method; but especially preferred is a solution polymerization method. The polymerization mode may be any of a batch-type mode or a continuous mode. During or after polymerization to give polybutadiene, a modifying agent may be reacted with the polymer to give a modified polybutadiene with various functional groups introduced into the active terminal and the like thereof.

In case where the polybutadiene is produced through anionic polymerization, the polymerization initiator to be used is preferably an organic alkali metal compound, more preferably a lithium compound. The lithium compound includes hydrocarbyl-lithium and lithium-amide compounds, etc. In case where a hydrocarbyl-lithium is used as the polymerization initiator, a modified polymer is obtained, which has a hydrocarbyl group at the polymerization initiation terminal thereof and in which the other terminal is a polymerization active site. On the other hand, in case where a lithium-amide compound is used as the polymerization initiator, then a modified polymer is obtained, which has a nitrogen-containing functional group at the polymerization initiation terminal thereof and in which the other terminal is a polymerization active site; and the polymer is, without being further modified with a modifying agent, usable as a modified conjugated dienic polymer in the present invention. The amount of the lithium compound to be used as the polymerization initiator is preferably within a range of from 0.2 to 20 mmol per 100 g of the monomer.

The hydrocarbyl-lithium includes ethyl-lithium, isopropyl-lithium, n-butyl-lithium, sec-butyl-lithium, tert-octyl-lithium, tert-butyl-lithium, etc.

For obtaining the polybutadiene having a 1,2-vinyl bond content of not more than the above-mentioned predetermined amount, preferred is polymerization in the presence of a rare earth element compound, especially a lanthanum series rare earth element-containing polymerization catalyst in an organic solvent.

The anionic polymerization may be carried out in the presence of a randomizer. The randomizer can control the microstructure of polybutadiene and, for example, controls the 1,2-vinyl bond content of the polybutadiene unit in the polymer that uses butadiene as the monomer.

The anionic polymerization may be carried out in any mode of solution polymerization, vapor-phase polymerization or bulk polymerization. The polymerization mode is not specifically defined, and may be a batch-type mode or a continuous mode.

The anionic polymerization temperature is preferably within a range of from 0 to 150° C., more preferably within a range of from 20 to 130° C. The polymerization may be attained under the generated pressure, but in general, it is desirable that the polymerization is attained under a pressure sufficient for keeping the polymer used substantially in a liquid phase. Here, in case where the polymerization is carried out under a higher pressure than the generated pressure, it is desirable that the reaction system is pressurized by an inert gas introduced thereinto. Preferably, the starting materials such as the monomer, the polymerization initiator, the solvent and others to be used for polymerization are treated for previously removing therefrom any reaction-retarding substances such as water, oxygen, carbon dioxide, protic compounds and others.

On the other hand, in case where the polybutadiene is produced through coordination polymerization, a rare earth metal compound is preferably used as the polymerization initiator, and more preferably, a combination of the following component (A), component (B) and component (C) is used. The coordination polymerization gives a polybutadiene having a polymerization active site.

The component (A) to be used in the coordination polymerization is selected from a rare earth metal compound, and a complex compound of a rare earth metal compound and a Lewis base. Here the rare earth metal compound includes rare earth element carboxylates, alkoxides, β-diketone complexes, phosphates, phosphites, etc.; and the Lewis base includes acetylacetone, tetrahydrofuran, pyridine, N,N-dimethylformamide, thiophene, diphenyl ether, triethylamine, organic phosphorus compounds, monohydric or dihydric alcohols, etc. The rare earth element of the rare earth metal compounds includes neodymium, etc. Concretely, the component (A) includes neodymium tri-2-ethylhexanoate and its complex with acetylacetone, neodymium trineodecanoate and its complex compound with acetylacetone, as well as neodymium neodecanoate, neodymium tri-n-butoxide, etc. Either singly or as combined, one or more different types of these may be used here as the component (A).

The component (B) for use for the coordination polymerization is selected from organic aluminium compounds. Concretely, there are mentioned trihydrocarbylaluminium compounds represented by a formula $R_3Al$; hydrocarbylaluminium hydrides represented by a formula $R_2AlH$ or $RAlH_2$ (in the formulae, Reach independently represents a hydrocarbon group having from 1 to 30 carbon atoms); hydrocarbylaluminoxane compounds having a hydrocarbon group with from 1 to 30 carbon atoms, etc. The organic aluminium compounds include, for example, trialkylaluminiums, dialkylaluminium hydrides, alkylaluminium dihydrides, alkylaluminoxanes (e.g., methylaluminoxane), etc. One or more different types of these compounds may be used here either singly or as combined. Preferably, as the component (B), an aluminoxanes is combined with any other organic aluminium compound.

The component (C) for use in the coordination polymerization is selected from a hydrolysable halogen-having compound and its complex compound with a Lewis base; an organic halogen compound having a tertiary alkyl halide, a benzyl halide or an allyl halide; an ionic compound comprising a non-coordinating anion and a counter cation, etc. The component (C) concretely includes alkylaluminiumdichlorides, dialkylaluminium chlorides, silicon tetrachloride, tin tetrachloride, complexes of zinc chloride with a Lewis such as alcohol or the like, complexes of magnesium chloride with a Lewis such as alcohol or the like, benzyl chloride, t-butyl chloride, benzyl bromide, t-butyl bromide, triphenylcarbonium tetrakis(pentafluorophenyl)borate, etc. Either singly or as combined, one alone or two or more different types of these may be used here as the component (C).

The above-mentioned polymerization initiator may be preliminarily prepared, optionally using the same conjugated diene compound and/or non-conjugated diene compound as the monomer for polymerization, in addition to the above-mentioned components (A), (B) and (C). A part or all of the component (A) or the component (C) may be held on an inert solid. The amount of each component to be used may be suitably defined. In general, the amount of the component (A) may be from 0.001 to 0.5 mmol per 100 g of the monomer. The ratio by mol of component (B)/component (A) is preferably from 5 to 1000; and the ratio by mol of component (C)/component (A) is preferably from 0.5 to 10.

Preferably, the coordination polymerization temperature is within a range of from −80 to 150° C., more preferably within a range of from −20 to 120° C. As the solvent for the coordination polymerization, usable is the hydrocarbon solvent inert to the reaction, which has been exemplified hereinabove for the anionic polymerization. The concentration of the monomer in the reaction solution may be the same as in the anionic polymerization. Further, the reaction pressure for the coordination polymerization may also be the same as that for the anionic polymerization; and also preferably, the starting materials to be used for the reaction are processed for removing therefrom substantially the reaction-retarding substances such as water, oxygen, carbon dioxide, protic compounds, etc.

The method of producing the modified polybutadiene in this embodiment includes a method of modifying the active terminal of the polybutadiene having an active terminal and produced in the manner as above, with a modifying agent; a method of modifying the terminal on the polymerization initiation side of polybutadiene with a modifying group-having polymerization initiator such as a lithium amide compound or the like in the manner as above; a multistage polymerization method of modifying the active terminal of polybutadiene with a modifying agent (first stage modification) followed by further reacting the modified group with another modifying agent; a method of grafting the main chain or the side chain of polybutadiene with a modifying agent; a method of copolymerizing the polybutadiene being prepared through polymerization, with a functional group-having monomer, etc.

In case where the active terminal of the active terminal-having polybutadiene produced in the manner as above is modified with a modifying agent for producing the above-mentioned modified polybutadiene, any of nitrogen-containing compounds, silicon-containing compounds, oxygen or sulfur-containing compounds, tin-containing compounds and the like may be used as the modifying agent.

As the modifying agent, those described in WO2006/112450, WO2007/040252 and JP-A 2009-242788 may be used here similarly.

More concretely, for example, there are mentioned those containing at least one functional group selected from an azacyclopropane group, a ketone group, a carboxyl group, a thiocarboxyl group, a carbonate, a carboxylic acid anhydride, a metal carboxylate salt, an acid halide, an urea group, a thiourea group, an amide group, a thioamide group, an isocyanate group, a thioisocyanate group, a halogenoisocyano group, an epoxy group, a thioepoxy group, an imine group and an M—Z bond (where M is Sn, Si, Ge, P, Z or a halogen atom), but not containing any active proton or onium salt that may deactivate the active organic metal side at the terminal of polymer as described in WO2006/112450.

Also usable here is an alkoxysilane compound having at least one functional group selected from (a) an epoxy group, (b) an isocyanate group and (c) a carboxyl group, as described in WO2007/040252. As a specific example, there is mentioned an epoxy group-having alkoxysilane compound; and preferred are
2-glycidoxyethyltrimethoxysilane,
2-glycidoxyethyltriethoxysilane,
(2-glycidoxyethyl)methyldimethoxysilane,
3-glycidoxypropyltrimethoxysilane,
3-glycidoxypropyltriethoxysilane,
(3-glycidoxypropyl)methyldimethoxysilane,
2-(3,4-epoxycyclohexyl)ethyltrimethoxysilane,
2-(3,4-epoxycyclohexyl)ethyltriethoxysilane,
2-(3,4-epoxycyclohexyl)ethyl(methyl)dimethoxysilane.

The isocyanate group-having alkoxysilane compound includes 3-isocyanatepropyltrimethoxysilane, 3-isocyanatepropyltriethoxysilane, 3-isocyanatepropylmethyldiethoxysilane, 3-isocyanatepropyltriisopropoxysilane, etc.

Further, the carboxyl group-having alkoxysilane compound includes 3-methacryloyloxypropyltriethoxysilane, 3-methacryloyloxypropyltrimethoxysilane, 3-methacryloyloxypropylmethyldiethoxysilane, 3-methacryloyloxypropyltriisopropoxysilane, etc.

Further, also usable here is a bifunctional silicon atom-containing compound in which one hydrocarbyloxy group and one reactive group directly bonds to the silicon atom and one protected primary amine group bonds to the silicon atom via an alkylene group, as described in JP-A 2009-242788.

Preferably, the modification with the modifying agent mentioned above is solution reaction, and the monomer used in polymerization may be contained in the solution system. The modification mode is not specifically defined, and may be a batch-type mode or a continuous mode. Further, the modification temperature is not specifically defined so far as the reaction can go on at the temperature. The polymerization reaction may be directly applied to the modification. The amount of the modifying agent to be used is preferably within a range of from 0.25 to 3.0 mol per one mol of the polymerization initiator used in producing polybutadiene, but more preferably within a range of from 0.5 to 1.5 mol.

Preferably, the polybutadiene for use in this embodiment is one processed to have an increased molecular weight through coupling treatment during the above-mentioned production process, from the viewpoint of preventing cold flow.

The coupling treatment is preferably according to a method of terminal modification with a polyfunctional reagent. The coupling treatment as referred to herein is for reacting polymers together, but is not for reacting the polymer with a filler during kneading like that for the above-mentioned terminal modification. The coupling treatment is intended to increase the molecular weight of the processed polymer by polymer branching.

The polybutadiene must be one having a higher Mooney viscosity ($ML_{1+4}$/100° C.) than that of the dienic rubber or the olefinic rubber immiscible with the polybutadiene to be mentioned below. Concretely, the Mooney viscosity of the polybutadiene is preferably from 50 to 90, more preferably from 50 to 75.

In this embodiment, "miscible" and "immiscible" are defined as follows: Specifically, in temperature dispersion measurement of dynamic elastic modulus, when the tan δ peak of each polymer contained in the sample is given separately, the polymers are immiscible with each other, but when the tan δ peak is given as a single peak, then the polymers are miscible with each other.

The measurement of dynamic elastic modulus is carried out using a dynamic viscoelasticity measuring device (Ares, by TA Instruments) within a temperature range of from −110 to 80° C.

In order to make the polybutadiene have a high Mooney viscosity as above, the weight-average molecular weight (Mw) of the polybutadiene rubber is preferably from 250,000 to 400,000, more preferably from 250,000 to 350,000.

The weight-average molecular weight (Mw) is measured through gel permeation chromatography (GPC, Tosoh's HLC-8020), using a refractometer as the detector, and is expressed as a polystyrene-equivalent value based on a monodispersed polystyrene standard. The column is GMHXL (by Tosho), and the eluent is tetrahydrofuran.

—Dienic Rubber, Olefinic Rubber—

The dienic rubber or the olefinic rubber in this embodiment is, as described above, immiscible with the above-mentioned polybutadiene.

The dienic rubber may be at least one of natural rubber (NR) and synthetic dienic rubber, and the rubber component may be pre-treated for viscosity reduction or chemical treatment. The synthetic dienic rubber is preferably one produced through emulsion polymerization or solution polymerization. Concretely, the synthetic dienic rubber includes polyisoprene rubber (IR), styrene-butadiene copolymer rubber (SBR), ethylene-propylene-diene rubber (EDPM), chloroprene rubber (CR), halogenated butyl rubber, acrylonitrile-butadiene rubber (NBR), etc. Preferred are natural rubber, polyisoprene rubber (IR), styrene-butadiene copolymer rubber (SBR), halogenated (brominated) butyl rubber, etc.; and more preferred are natural rubber and polyisoprene rubber (IR). Even more preferred is natural rubber from the viewpoint of low heat generation, abrasion resistance, crack growth resistance, tear resistance, etc.

On the other hand, the olefinic rubber includes, for example, ethylene-propylene rubber (EDPM, EPM), maleic acid-modified ethylene-propylene rubber (M-EPM), butyl rubber (IIR), copolymer of isobutylene and aromatic vinyl or dienic monomer, acrylic rubber (ACM), ionomer, etc. Of those, preferred is EPDM.

One alone or two or more different types of these dienic rubbers or olefinic rubbers may be used either singly or as blended.

In this embodiment, used is a rubber component containing a polybutadiene and a dienic rubber or an olefinic rubber immiscible with the polybutadiene. Preferably, in the rubber component, the content mass ratio (A/B) of the content mass A of the polybutadiene to the content mass B of the dienic rubber or the olefinic rubber immiscible with the polybutadiene fall within a range of from 40/60 to 60/40. When the content mass ratio (A/B) falls within the range, the rubber composition can be excellent in fracture resistance not lowering the durability thereof such as abrasion resistance, etc.

The content mass ratio (A/B) is more preferably within a range of from 45/55 to 55/45.

As described above, in case where the dienic rubber or the olefinic rubber is kneaded with the above-mentioned polybutadiene, the polybutadiene to be used must be one having a higher Mooney viscosity ($ML_{1+4}/100°$ C.) than that of the dienic rubber or the olefinic rubber. In this case, preferably, the Mooney viscosity of the dienic rubber or the olefinic rubber is, in an opposite manner, defined to be low. Concretely, it is desirable that the Mooney viscosity of the dienic rubber or the olefinic rubber is from 45 to 75, more preferably from 50 to 65.

In order that the Mooney viscosity of the dienic rubber or the olefinic rubber is defined to be low, falling within the above range, it is desirable that the molecular chains of the molecules constituting these are previously cut for viscosity reduction, before kneading.

As the method for cutting the molecular chains of the molecules in the rubber, for example, there may be mentioned a method of introducing a functional group into the rubber through oxidation by peptizing the rubber along with a peptizer added thereto.

As one example, described here is a method of peptizing a natural rubber by adding a peptizer thereto. As the peptizer, preferably mentioned are aromatic mercaptan compounds, disulfide compounds and their zinc salts, organic peroxides, nitro compounds, nitroso compounds, etc. The amount of the peptizer to be added is preferably from 0.01 parts by mass to 5 parts by mass or so per 100 parts by mass of natural rubber. When the amount added is too small, then the desired effect could not be attained; but when too large, the mechanical properties of the processed rubber would lower.

As the peptizing machine, for example, there are mentioned a rolling machine, a closed kneading machine, a Gordon plasticator, etc. For these peptizing machines, the rotation number, the peptizing temperature and the peptizing time may be suitably defined in order that the Mooney viscosity of the processed rubber could fall within the desired range.

(Filler)

The rubber composition of this embodiment contains a filler. The filler includes carbon black, silica, clay, talc, calcium carbonate, aluminium hydroxide, etc. The type of the filler to be used here is not specifically defined, and the filler to be used here may be suitably selected from any ordinary filler for rubber. Preferably, the filler to be used here contain at least any of carbon black and an inorganic filler from the viewpoint of more enhancing the durability such as the abrasion resistance of the rubber composition. As the inorganic filler, more preferred is silica. In case where such an inorganic filler such as silica or the like is used, a silane coupling agent may be used together.

In this embodiment, preferably, at least one inorganic filler represented by the following general formula (I) is used as the filler in addition to carbon black and silica.

$$nM.xSiO_y.zH_2O \qquad (I)$$

[In the formula, M is at least one selected from, a metal selected from aluminium, magnesium, titanium, calcium and zirconium, and oxides or hydroxides of those metals, their hydrates and carbonates of the metals; n, x, y and z each indicate an integer of from 1 to 5, an integer of from 0 to 10, an integer of from 2 to 5, and an integer of from 0 to 10, respectively.]

Using the inorganic filler represented by the above-mentioned general formula (I), in addition to carbon black and silica, effectively enhances the reinforcing effect of the filler and can satisfy both abrasion resistance and low heat generation (low fuel consumption) when the rubber composition is formed into tires.

Using both carbon black and silica, as combined, also satisfies both abrasion resistance and low heat generation (low fuel consumption).

The carbon black to be used here may be any one generally used in rubber industry. For example, various grades of carbon black such as SAF, HAF, ISAF, FEF, GPF and others can be used here either singly or as combined.

The silica is not specifically defined. Preferred are precipitated silica, fumed silica and colloidal silica. One or more of these may be used here either singly or as combined.

The inorganic filler represented by the above-mentioned general formula (I) concretely includes alumina ($Al_2O_3$) such as γ-alumina, α-alumina, etc.; alumina monohydrate ($Al_2O_3.H_2O$) such as boehmite, diaspore, etc.; aluminium hydroxide [$Al(OH)_3$] such as gibbsite, bayerite, etc.; aluminium carbonate [$Al_2(CO_3)_2$], magnesium hydroxide [$Mg(OH)_2$], magnesium oxide (MgO), magnesium carbonate ($MgCO_3$), talc ($3MgO.4SiO_2.H_2O$), attapulgite ($5MgO.8SiO_2.9H_2O$), titanium white ($TiO_2$), titanium black ($TiO_2$), calcium oxide (CaO), calcium hydroxide [$Ca(OH)_2$], aluminium magnesium oxide ($MgO.Al_2O_3$) clay ($Al_2O_3.2SiO_2$), kaolin ($Al_2O_3.2SiO_2.2H_2O$), pyrophyllite ($Al_2O_3.4SiO_2.H_2O$), bentonite ($Al_2O_3.4SiO_2.2H_2O$), aluminium silicate ($Al_2SiO_5$, $Al_4.3SiO_4.5H_2O$, etc.), magnesium silicate ($Mg2SiO_4$, $MgSiO_3$, etc.), calcium silicate ($Ca_2.SiO_4$, etc.), aluminium calcium silicate ($Al_2O_3.CaO.2SiO_2$, etc.), magnesium calcium silicate ($CaMgSiO_4$), calcium carbonate ($CaCO_3$), zirconium oxide ($ZrO_2$), zirconium hydroxide [$ZrO(OH)_2.nH_2O$], zirconium carbonate [$Zr(CO_3)_2$]; as well as crystalline aluminosilicate salts containing a charge-correcting hydrogen, alkali metal or alkaline earth metal such as various types of zeolite; and any of these is usable here.

As the inorganic filler represented by the general formula (I), preferred are those where M is at least one selected from an aluminium metal, aluminium oxide or hydroxide, or their hydrates, and aluminium carbonate.

The content of the filler is preferably from 30 parts by mass to 70 parts by mass per 100 parts by mass of the rubber component. When the amount falls within the above range, the filler may satisfy both reinforcing performance and low heat generation (low fuel consumption) when the rubber composition is used for tires and further the workability of the composition may be bettered.

The content is more preferably from 30 parts by mass to 65 parts by mass.

In the rubber composition of this embodiment, any ordinary additive material for rubber generally used in the field of rubber industry, such as process oil or the like oily component, as well as vulcanizing agent, vulcanization accelerator, Antiaging agent, softener, zinc oxide, antiozonant, colorant, antistatic agent, lubricant, antioxidant, coupling agent, foaming agent, foaming promoter, stearic acid and the like may be incorporated, in addition to the rubber component and the filler such as carbon black therein, within a range not detracting from the advantage of this embodiment. Commercial products are favorably used for the additive materials.

The oily component such as process oil is not specifically defined, and any one may be suitably selected in accordance with the intended object. The oily component includes aromatic oil, naphthene oil, paraffin oil, ester oil, solution-type conjugated diene rubber, solution-type hydrogenated conjugated diene rubber, etc. When such an oily component is incorporated in the rubber composition, then the flowability of the rubber composition can be controlled, and therefore by lowering the viscosity of the rubber composition before vulcanization to increase the flowability thereof, the rubber composition can be extremely favorably extruded, and in this point, the oily component is advantageous.

As the vulcanizing agent, at least one of an organic thiosulfate compound (for example, sodium 1,6-hexamethylene-dithiosulfate dehydrate) and a bismaleimide compound (for example, phenylenebismaleimide) may be used in addition to conventional sulfur.

The vulcanization accelerator includes thiuram compounds such as tetrakis-2-ethylhexylthiuram disulfide, tetrakis-2-isopropylthiuram disulfide, tetrakis-dodecylthiuram disulfide, tetrakis-benzylthiuram disulfide, etc.; dithiocarbamate salt compounds such as zinc di-2-ethylhexyldithiocarbamate, zinc dodecyldithiocarbamate, zinc benzyldithiocarbamate, etc.; benzothiazolyl vulcanization accelerators such as dibenzothiazyl disulfide, 4,4'-dimethyldibenzothiazyl disulfide, N-cyclohexyl-2-benzothiazyl-sulfenamide, N-t-butyl-2-benzothiazyl-sulfenamide, N-t-butyl-2-benzothiazyl-sulfenimide, N-oxydiethylene-benzothiazyl-sulfenamide, N,N'-dicyclohexyl-2-benzothiazyl-sulfenamide, etc.

The antioxidant include, for example, 3C (N-isopropyl-N'-phenyl-p-phenylenediamine), 6C [N-(1,3-dimethylbutyl)-N'-phenyl-p-phenylenediamine], AW (6-ethoxy-2,2,4-trimethyl-1,2-dihydroquinoline), high-temperature condensate of diphenylamine and acetone, etc.

The rubber composition of this embodiment may be produced by selecting, as the rubber component, the above-mentioned polybutadiene, and a dienic rubber or an olefinic rubber immiscible with the polybutadiene and having a lower Mooney viscosity than the polybutadiene, kneading them with a rubber filler and other optional ingredients, then warming, extruding and vulcanizing the mixture.

The kneading condition is not specifically defined. Depending on the amount of each component to be put into the kneading apparatus, the rotation speed of the rotor, the ram-air pressure, the kneading temperature, the kneading time, the type of the kneading device and others, the kneading condition may be suitably defined. As the kneading apparatus, there may be mentioned a single-screw kneading extruder and a multi-screw kneading extruder (continuous kneading apparatus) generally used for kneading a rubber composition, as well as a mating or non-mating rotor-having kneading machine such as a Banbury mixer, an intermix, a kneader, etc., or a roll (batch-type kneading apparatus), etc. Different types of these may be combined for use herein.

The rubber composition of this embodiment is, after kneaded with the above-mentioned kneading machine, molded and then vulcanized for use for tires such as tire treads, undertreads, carcasses, sidewalls, bead parts, etc., and further for use for other various industrial products such as antivibration rubbers, fenders, belts, hoses, etc. In particular, the rubber composition is favorably used as sidewall rubbers or tread rubbers for fuel-efficient tires, large-sized tires and high-performance tires, as excellent in balance of low heat generation, abrasion resistance and fracture strength.

<Tire>

The tire of this embodiment comprises the above-mentioned rubber composition. Specifically, the pneumatic tire of this embodiment contains the rubber composition as any of the tire constitutive members. The tire constitutive members include, for example, tread, undertread, sidewall, carcass coating rubber, belt coating rubber, bead filler rubber, chafer, bead coating rubber, cushion rubber, etc.

In case where a pneumatic tire is produced by the use of the rubber composition of this embodiment, for example, a bead filler member or a side-reinforcing rubber for run flat tires is produced by the use of an extruder or a calender, then this is stuck to any other member on a molding drum to produce a green tire, and the green tire is put in a tire mold and vulcanized therein while pressure is given thereto from the inside. The inside of the tire of this embodiment may be filled with nitrogen or an inert gas apart from air.

One preferred example of the pneumatic tire comprises a pair of bead parts, a carcass toroidally connecting to the bead part, a belt to hoop the crown part of the carcass and a tread. The pneumatic tire of this embodiment may have a radial structure or a bias structure.

Thus obtained, the pneumatic tire of this embodiment is excellent in reinforcing performance, abrasion resistance and fracture resistance and is lightweight.

The present invention has been described hereinabove with reference to its embodiment as above; however, not limited to the above-mentioned embodiment, the invention may undergo various changes and modifications within a range not overstepping the object thereof.

EXAMPLES

This embodiment is described in more detail with reference to the following Examples; however, the embodiment is not limited to these Examples. Unless otherwise specifically indicated in the following, "part" is part by mass and "%" is % by mass.

The properties were measured according to the following methods.
<Physical Properties of Rubber Before Kneading>
(1) Measurement of Weight-Average Molecular Weight (Mw)

Mw was measured through GPC (with Tosoh's HLC-8020) using a refractiometer as the detector, and was expressed as a polystyrene-equivalent value based on a monodispersed polystyrene standard. The column was GMHXL (by Tosoh Corporation), and the eluent was tetrahydrofuran.

(2) Measurement of Mooney Viscosity $ML_{1+4}$ (100° C.)

Measured according to JIS K6300-1:2001, using a rotorless Mooney apparatus.

(3) Analysis of Polybutadiene Structure

Using a Fourier transform IR spectrometer (trade name "FT/IR-4100", by JASCO), the 1,2-vinyl bond content (%) in polybutadiene was measured through Fourier transform IR spectrometry described in JP-A 2005-015590.
<Characteristics of Rubber Composition and Tire Performance>
(1) Fracture Resistance According to JIS K6251:2004, the cutting tension (TSb) of a vulcanized rubber sheet was measured at room temperature (25° C.) Table 3 shows the fracture resistance as index indication based on the value of Comparative Example 1 referred to as 100; and Table 4 shows it as index indication based on the value of Example 12 referred to as 100. The samples having a larger index are better.

(2) Abrasion Resistance

Using a Lambourn abrasion tester, the abrasion amount of a vulcanized sheet was measured at a slip ratio of 25%. Table 3 shows the abrasion resistance as index indication based on the reciprocal of the value of Comparative Example 1 referred to as 100; and Table 4 shows it as index indication based on the reciprocal of the value of Example 12 referred to as 100. The measurement temperature was room temperature. The samples having a larger index are better.

(3) Low-Loss Property (tan δ)

Using a viscoelasticity measuring device by Rheometric, the los tangent tan δ of the rubber composition sample was measured at a temperature of 50° C., at a frequency of 15 Hz and at a strain of 5%. The data were expressed as index indication according to the following formula, as based on the value of the rubber composition of Comparative Example 1 or Example 12 referred to as 100. Regarding the low-loss property (tan δ), the samples having a lower index value have a better low-loss property.

Index of Low-Loss Property=(loss tangent tan δ of the rubber composition sample tested/loss tangent tan δ of the rubber composition of Comparative Example 1 or Example 12)×100

(4) Measurement of Bound Rubber Amount

After kneaded, 0.4 g of unvulcanized rubber was cut into pieces 2 mm square, and put into a sample tube along with 50 mL of toluene therein, and kept static at room temperature for 48 hours. Subsequently, this was extracted through a glass filter, and the toluene solution part and the rubber part were individually dried. The weight of the rubber part on the filter was calculated to be the bound rubber amount. Further, the dried toluene solution part was dissolved in chloroform, and the ratio of polybutadiene was calculated through proton NMR, and based on the value, the polybutadiene bound rubber amount was back-calculated from the actual amount added to the rubber. The data were expressed by index indication based on the bound rubber amount in Comparative Example 1 or Example 12 referred to as 100.

(5) Evaluation of Workability

The kneaded rubber after master batch was introduced through rolls at 50° C., and the workability thereof was evaluated from the rubber feeling and the rubber peelability. The samples with good workability are expressed as "O".
<Polybutadiene, Natural Rubber>
(Production of Polybutadienes (BR-1 to BR-6))

BR-1 to 3

7.11 g of a cyclohexane solution of butadiene (15.2% by mass), 0.59 mL of a cyclohexane solution of neodymium neodecanoate (0.56 mol/L), 10.32 mL of a toluene solution of methyl aluminoxanes MAO (by Tosoh Akzo, PMAO) (3.23 mol/L as aluminium concentration), and 7.77 mL of a hexane solution of diisobutylaluminium hydride (by Kanto Chemical) (0.90 mol/L) were, in that order, put into a dried and nitrogen-purged 100-ml glass bottle with a rubber stopper, and ripened at room temperature for 2 minutes, and then 1.45 mL of a hexane solution of diethylaluminium chloride (by Kanto Chemical) (0.95 mol/L) was added thereto and ripened for 15 minutes with occasionally stirring at room temperature. Thus obtained, the neodymium concentration in the catalyst solution was 0.011 mol/L.

A glass bottle with a rubber stopper having a capacity of about 1 L was dried and purged with nitrogen, and a cyclohexane solution of dried and purified butadiene, and dry cyclohexane were put thereinto to give a state where 400 g of a cyclohexane solution having a concentration of 12% by mass put therein. Next, the catalyst solution prepared in the above was put into the bottle, and the monomer was polymerized in a water bath at 50° C. for 1 hour. The added amount was 1.17 mL (BR-1), 1.35 mL (BR-2) and 1.56 mL (BR-3).

Subsequently, 2 ml of an isopropanol 5% solution of an antioxidant, 2,2'-methylenebis(4-ethyl-6-t-butylphenol) (NS-5) was added thereto at 50° C. and the reaction was stopped, and further, this was reprecipitated in isopropanol containing a minor amount of NS-5, and dried with a drum to give BR-1 to 3 at an yield of almost 100%.

BR-4

The catalyst solution and the monomer solution prepared in the same manner as those for BR-1 to 3 were used. 1.85 mL of the catalyst solution was put into a glass bottle with a rubber stopper, and the monomer was polymerized in a water bath at 50° C. for 1 hour. Subsequently, a dioctyltin bisoctylmaleate solution (0.2 mol/L) was added thereto in an amount of 1.1 equivalents to neodymium, and reacted at 50° C. for 30 minutes. Subsequently, at 50° C., 2 mL of an isopropanol 5 mas % solution of an antioxidant NS-5 was added thereto and the polymerization reaction was stopped, and further, this was reprecipitated in isopropanol containing a minor amount of NS-5, and dried with a drum drier to give BR-4 at an yield of almost 100%.

BR-5

28.3 g of cyclohexane, 50 g of 1,3-butadiene monomer, 0.0057 mmol of 2,2-ditetrahydrofurylpropane and 0.513 mmol of hexamethylamine were, each in the form of a hexane solution thereof, put into a dried and nitrogen-purged pressure-tight glass container having an internal volume of about 900 ml, and 0.57 mmol of n-butyllithium (BuLi) was added thereto, and thereafter the monomer was polymerized in a stirrer-equipped water bath at 50° C. for 4.5 hours. The polymerization conversion ratio was almost 100%. 0.100 mmol of tin tetrachloride was, as a cyclohexane solution thereof, added to the polymerization system, and stirred at 50° C. for 30 minutes. Afterwards, 0.5 ml of an isopropanol 5 mas % solution of 2,6-di-tert-butyl-p-cresol (BHT) was added thereto to stop the reaction, and this was dried according to an ordinary method to give BR-5.

BR-6

28.3 g of cyclohexane, 50 g of 1,3-butadiene monomer and 0.0057 mmol of 2,2-ditetrahydrofurylpropane were, each in the form of a hexane solution thereof, put into a dried and nitrogen-purged pressure-tight glass container having an internal volume of 900 ml, and 0.57 mmol of n-butyllithium (BuLi) was added thereto, and thereafter the monomer was polymerized in a stirrer-equipped water bath at 50° C. for 4.5 hours. The polymerization conversion ratio was almost 100%. 0.100 mmol of tin tetrachloride was, as a cyclohexane solution thereof, added to the polymerization system, and stirred at 50° C. for 30 minutes. Afterwards, 0.5 ml of an isopropanol 5% solution of 2,6-di-tert-butyl-para-cresol (BHT) was added thereto to stop the reaction, and this was dried according to an ordinary method to give BR-6.

(Production of Modified Polybutadiene (BR-7 to BR-11), Polybutadiene (BR-12))

BR-12

7.11 g of a cyclohexane solution of butadiene (15.2% by mass), 0.59 mL of a cyclohexane solution of neodymium neodecanoate (0.56 mol/L), 10.32 mL of a toluene solution of methyl aluminoxanes MAO (by Tosoh Akzo, PMAO) (3.23 mol/L as aluminium concentration), and 7.77 mL of a hexane solution of diisobutylaluminium hydride (by Kanto Chemical) (0.90 mol/L) were, in that order, put into a dried and nitrogen-purged 100-ml glass bottle with a rubber stopper, and ripened at room temperature for 2 minutes, and then 1.45 mL of a hexane solution of diethylaluminium chloride (by Kanto Chemical) (0.95 mol/L) was added thereto and ripened for 15 minutes with occasionally stirring at room temperature. Thus obtained, the neodymium concentration in the catalyst solution was 0.011 mol/L.

A glass bottle with a rubber stopper having a capacity of about 1 L was dried and purged with nitrogen, and a cyclohexane solution of dried and purified butadiene, and dry cyclohexane were put thereinto to give a state where 400 g of a cyclohexane solution having a concentration of 12% by mass put therein. Next, the catalyst solution prepared in the above was put into the bottle, and the monomer was polymerized in a water bath at 50° C. for 1 hour. Subsequently, 2 ml of an isopropanol 5% solution of an antioxidant, 2,2'-methylenebis(4-ethyl-6-t-butylphenol) (NS-5) was added thereto at 50° C. and the reaction was stopped, and further, this was reprecipitated in isopropanol containing a minor amount of NS-5, and dried with a drum to give BR-12 at an yield of almost 100%.

BR-7 to BR-10

The catalyst solution and the monomer solution prepared in the same manner as those for BR-12 were used. 1.85 mL of the catalyst solution was put into a glass bottle with a rubber stopper, and the monomer was polymerized in a water bath at 50° C. for 1 hour. The amount of the catalyst added was 1.17 mL (BR-7), 1.35 mL (BR-8), 1.56 mL (BR-9) and 1.35 mL (BR-10). Subsequently, the modifying agent shown in Table 2 was added to each system, then gradually heated and stirred in a water bath at each polymerization temperature. Subsequently, 0.2 mol/L of each modifying agent was added in an amount of 1 equivalent to neodymium, and reacted at 50° C. for 30 minutes. Subsequently, at 50° C., 2 mL of an isopropanol 5 mas % solution of an antioxidant NS-5 was added thereto and the polymerization reaction was stopped, and further, this was reprecipitated in isopropanol containing a minor amount of NS-5, and dried with a drum drier to give BR-7 to BR-10 at an yield of almost 100%.

BR-11

28.3 g of cyclohexane, 50 g of 1,3-butadiene monomer, 0.0057 mmol of 2,2-ditetrahydrofurylpropane and 0.513 mmol of hexamethylamine were, each in the form of a hexane solution thereof, put into a dried and nitrogen-purged pressure-tight glass container having an internal volume of about 900 ml, and 0.57 mmol of n-butyllithium (BuLi) was added thereto, and thereafter the monomer was polymerized in a stirrer-equipped water bath at 50° C. for 4.5 hours. The polymerization conversion ratio was almost 100%. 0.100 mmol of tin tetrachloride was, as a cyclohexane solution thereof, added to the polymerization system, and stirred at 50° C. for 30 minutes. Afterwards, 0.5 ml of an isopropanol 5 mas % solution of 2,6-di-tert-butyl-p-cresol (BHT) was added thereto to stop the reaction, and this was dried according to an ordinary method to give BR-11.

(Preparation of Natural Rubber (NR))

A natural rubber #RSS3 was used. 0.06 parts by mass of a peptizer, O,O)'-dibenzamidodiphenyl disulfide (Noctizer SS, by Ouchi Shinko Chemical) was added to 100 parts by mass of the natural rubber (NR-1), and peptization was started in a Banbury mixer at a temperature of 110° C. For a peptization period of 60 seconds, 120 seconds or 240 seconds, peptized rubbers NR-2 to NR-4 were prepared. The molecular weight and the Mooney viscosity (workability) of these peptized rubbers were measured according to the above-mentioned methods.

The characteristics of these rubbers are summarized and shown in Table 1 and Table 2. NR-1 to NR-4 are shown in both Table 1 and Table 2.

In BR-1 to BR-12 in Table 1 and Table 2, the number average molecular weight (Mn) "360" is an abbreviation of "360000".

TABLE 1

|  | BR-1 | BR-2 | BR-3 | BR-4 | BR-5 | BR-6 | NR-1 | NR-2 | NR-3 | NR-4 |
|---|---|---|---|---|---|---|---|---|---|---|
| Number-Average Molecular Weight (Mn) (unit × $10^3$) | 360 | 360 | 360 | 265 | 361 | 180 | — | — | — | — |
| Mooney Viscosity $ML_{1+4}$ (100° C.) | 85 | 85 | 60 | 46 | 78 | 68 | 85 | 60 | 48 | 40 |
| 1,2-Vinyl Bond Content (%) | 0.7 | 0.7 | 0.8 | 0.8 | 0.9 | 14.1 | — | — | — | — |

TABLE 2

|  | BR-7 | BR-8 | BR-9 | BR-10 | BR-11 | BR-12 | NR-1 | NR-2 | NR-3 | NR-4 |
|---|---|---|---|---|---|---|---|---|---|---|
| Number-Average Molecular Weight (Mn) (unit × $10^3$) | 363 | 298 | 268 | 300 | 180** | 301 | — | — | — | — |
| Modifying Agent* | 1 | 1 | 1 | 2 | 3 | — | — | — | — | — |
| Mooney Viscosity $ML_{1+4}$ (100° C.) | 85 | 60 | 50 | 60 | 68 | 60 | 85 | 60 | 48 | 40 |
| 1,2-Vinyl Bond Content (%) | 0.7 | 0.8 | 0.8 | 0.7 | 14.1 | 0.7 | — | — | — | — |

*Modifying Agent
1: 4,4-diethylaminobenzophenone
2: 2-cyanopyridine
3: tin tetrachloride
**Coupling part is 534. (unit × $10^3$)

Examples 1 to 6, and Comparative Examples 1 to 2

A mixture having the compositional formulation shown in Table 3 below was kneaded with a Banbury mixer to give an unvulcanized rubber composition, then sheeted to have a thickness of 2 mm, and vulcanized at 145° C. for 30 minutes. The obtained vulcanized rubber was evaluated for the rubber characteristics thereof according to the methods mentioned above.

From the formulations of Examples and Comparative Examples shown in Table 3, carbon black was removed; and the remaining formulations were individually kneaded and vulcanized in the same manner as above. The obtained sheets were evaluated for the abrasion resistance and the fracture resistance. The workability was evaluated in the stage of kneading. The results are summarized and shown in Table 3.

TABLE 3

|  |  |  | Example | | | | | | Comparative Example | |
|---|---|---|---|---|---|---|---|---|---|---|
|  |  |  | 1 | 2 | 3 | 4 | 5 | 6 | 1 | 2 |
| Formulation (mas. pt.) | Natural Rubber | NR-1 | — | — | — | — | — | — | 50 | — |
|  |  | NR-2 | 50 | 50 | — | 50 | 50 | 50 | — | 50 |
|  |  | NR-3 | — | — | 50 | — | — | — | — | — |
|  |  | NR-4 | — | — | — | — | — | — | — | — |
|  | Polybutadiene | BR-1 | 50 | — | — | — | — | — | — | — |
|  |  | BR-2 | — | 50 | 50 | — | — | — | — | — |
|  |  | BR-3 | — | — | — | 50 | — | — | 50 | — |
|  |  | BR-4 | — | — | — | — | — | — | — | 50 |
|  |  | R-5 | — | — | — | — | 50 | — | — | — |
|  |  | BR-6 | — | — | — | — | — | 50 | — | — |
|  | Carbon Black[1) |  | 50 | 50 | 50 | 50 | 50 | 50 | 50 | 50 |
|  | Stearic Acid |  | 2.0 | 2.0 | 2.0 | 2.0 | 2.0 | 2.0 | 2.0 | 2.0 |
|  | Antioxidant 6C[2) |  | 3.5 | 3.5 | 3.5 | 3.5 | 3.5 | 3.5 | 3.5 | 3.5 |
|  | Zinc Flower |  | 3.0 | 3.0 | 3.0 | 3.0 | 3.0 | 3.0 | 3.0 | 3.0 |
|  | Antioxidant 224[3) |  | 1.0 | 1.0 | 1.0 | 1.0 | 1.0 | 1.0 | 1.0 | 1.0 |
|  | Vulcanization Accelerator CZ[4) |  | 0.4 | 0.4 | 0.4 | 0.4 | 0.4 | 0.4 | 0.4 | 0.4 |
|  | Vulcanization Accelerator DM[5) |  | 0.2 | 0.2 | 0.2 | 0.2 | 0.2 | 0.2 | 0.2 | 0.2 |
|  | Sulfur |  | 1.4 | 1.4 | 1.4 | 1.4 | 1.4 | 1.4 | 1.4 | 1.4 |
|  | Bound Rubber Amount of Polybutadiene (index) |  | 108 | 105 | 109 | 108 | 113 | 107 | 100 | 95 |
| Evaluation | Abrasion Resistance (index) |  | 107 | 105 | 110 | 111 | 105 | 104 | 100 | 97 |

TABLE 3-continued

|  |  | Example | | | | | | Comparative Example | |
| --- | --- | --- | --- | --- | --- | --- | --- | --- | --- |
|  |  | 1 | 2 | 3 | 4 | 5 | 6 | 1 | 2 |
| Fracture Resistance (index) | | 110 | 108 | 105 | 109 | 108 | 105 | 100 | 98 |
| Workability | | ○ | ○ | ○ | ○ | ○ | ○ | — | ○ |

[Notes]
[1] Carbon black: ISAF, Asahi Carbon's trade name "Asahi#80"
[2] Antioxidant 6C: N-(1,3-dimethylbutyl)-N'-phenyl-p-phenylenediamine, Seiko Chemical's trade name "Ozonone 6C"
[3] Antioxidant 224: 2,2,4-trimethyl-1,2-dihydroquinoline polymer, Ouchi Shinko Chemical' trade name "Nocrac 224"
[4] Vulcanization accelerator CZ: N-cyclohexyl-2-benzodiazolylsulfenamide, Ouchi Shinko Chemical' trade name "Nocceler CZ"
[5] Vulcanization accelerator DM: di-2-benzothiazolyl disulfide, Ouchi Shinko Chemical' trade name "Nocceler DM"

Examples 7 to 12, and Comparative Example 3

A mixture having the compositional formulation shown in Table 4 below was kneaded with a Banbury mixer to give an unvulcanized rubber composition, then sheeted to have a thickness of 2 mm, and vulcanized at 145° C. for 30 minutes. The obtained vulcanized rubber was evaluated for the rubber characteristics thereof according to the methods mentioned above.

From the formulations of Examples and Comparative Examples shown in Table 4, carbon black was removed; and the remaining formulations were individually kneaded and vulcanized in the same manner as above. The obtained sheets were evaluated for the abrasion resistance, the fracture resistance and the low-loss property. The results are summarized and shown in Table 4.

As obvious from the results shown in Table 3, the rubber compositions of Examples prepared by kneading the combination of polybutadiene and natural rubber, in which the Mooney viscosity of polybutadiene is higher than the Mooney viscosity of natural rubber, satisfy both good abrasion resistance and good fracture resistance and, in addition thereto, have good workability.

On the other hand, the rubber compositions of Comparative Examples prepared by kneading the composition of polybutadiene and natural rubber, in which the Mooney viscosity of natural rubber is higher than the Mooney viscosity of polybutadiene, were inferior to the rubber compositions of Examples in point of both abrasion resistance and fracture resistance.

In addition, as also obvious from the results shown in Table 4, the rubber compositions of Examples prepared by kneading the combination of modified polybutadiene and natural rubber, in which the Mooney viscosity of the modified polybutadiene is higher than the Mooney viscosity of

TABLE 4

|  |  |  | Example | | | | | | Comparative Example |
| --- | --- | --- | --- | --- | --- | --- | --- | --- | --- |
|  |  |  | 7 | 8 | 9 | 10 | 11 | 12 | 3 |
| Formulation (mas. pt.) | Natural Rubber | NR-1 | — | — | — | — | — | — | 50 |
|  |  | NR-2 | 50 | 50 | — | 50 | 50 | 50 | — |
|  |  | NR-3 | — | — | 50 | — | — | — | — |
|  |  | NR-4 | — | — | — | — | — | — | — |
|  | Polybutadiene | BR-7 | 50 | — | — | — | — | — | — |
|  |  | BR-8 | — | 50 | — | — | — | — | — |
|  |  | BR-9 | — | — | 50 | — | — | — | 50 |
|  |  | BR-10 | — | — | — | 50 | — | — | — |
|  |  | BR-11 | — | — | — | — | 50 | — | — |
|  |  | BR-12 | — | — | — | — | — | 50 | — |
|  | Carbon Black[1] | | 50 | 50 | 50 | 50 | 50 | 50 | 50 |
|  | Stearic Acid | | 2 | 2 | 2 | 2 | 2 | 2 | 2 |
|  | Antioxidant 6C[2] | | 3.5 | 3.5 | 3.5 | 3.5 | 3.5 | 3.5 | 3.5 |
|  | Zinc Flower | | 3 | 3 | 3 | 3 | 3 | 3 | 3 |
|  | Antioxidant 224[3] | | 1 | 1 | 1 | 1 | 1 | 1 | 1 |
|  | Vulcanization Accelerator CZ[4] | | 0.4 | 0.4 | 0.4 | 0.4 | 0.4 | 0.4 | 0.4 |
|  | Vulcanization Accelerator DM[5] | | 0.2 | 0.2 | 0.2 | 0.2 | 0.2 | 0.2 | 0.2 |
|  | Sulfur | | 1.4 | 1.4 | 1.4 | 1.4 | 1.4 | 1.4 | 1.4 |
| Bound Rubber Amount of Polybutadiene (index) | | | 108 | 111 | 107 | 115 | 116 | 100 | 103 |
| Evaluation | Abrasion Resistance (index) | | 107 | 105 | 110 | 111 | 104 | 100 | 97 |
|  | Fracture Resistance (index) | | 110 | 111 | 108 | 113 | 108 | 100 | 98 |
|  | Low-Loss Property (index) | | 86 | 89 | 92 | 85 | 83 | 100 | 92 |

[Notes]
[1] to [5] are the same as in Table 3 natural rubber, satisfy both good abrasion resistance and good fracture resistance and, in addition thereto, have good low-loss property. Further, the rubber compositions of Examples 7 to 11 in which modified polybutadiene was used are better than the rubber composition of Example 12 in which unmodified polybutadiene was used, in point of the abrasion resistance and the fracture resistance thereof.

On the other hand, the rubber composition of Comparative Example prepared by kneading the composition of modified polybutadiene and natural rubber, in which the Mooney viscosity of natural rubber is higher than the Mooney viscosity of modified polybutadiene, were inferior to the rubber compositions of Examples in point of both abrasion resistance and fracture resistance.

The invention claimed is:

1. A rubber composition which comprises a rubber component containing a polybutadiene and an additional rubber immiscible with the polybutadiene chosen from the group consisting of dienic rubbers and olefinic rubbers, and a filler, and in which the Mooney viscosity ($ML_{1+4}$/100° C.) of the polybutadiene referred to as ML(I), and the Mooney viscosity ($ML_{1+4}$/100° C.) of the dienic rubber or the olefinic rubber immiscible with the polybutadiene referred to as ML(II) are in a relation of ML(I)≥ML(II) prior to the polybutadiene and the dienic or olefinic rubber being combined in the rubber composition, wherein the polybutadiene is one processed to have an increased molecular weight through coupling treatment, and ML(I) is within a range of from 50 to 90 and ML(II) is within a range of from 40 to 85.

2. The rubber composition according to claim 1, wherein the dienic rubber immiscible with the polybutadiene is a natural rubber or a polyisoprene rubber.

3. The rubber composition according to claim 1, wherein the content mass ratio (A/B) of the content mass A of the polybutadiene to the content mass B of the dienic rubber or the olefinic rubber immiscible with the polybutadiene falls within a range of from 40/60 to 60/40.

4. The rubber composition according to claim 1, wherein the polybutadiene is a modified polybutadiene.

5. The rubber composition according to claim 4, wherein the modified polybutadiene is modified with a functional group having an affinity for at least one selected from carbon black and an inorganic filler.

6. The rubber composition according to claim 4, wherein the modified polybutadiene is modified with a functional group having an affinity for at least one selected from carbon black and an inorganic filler.

7. The rubber composition according to claim 1, wherein the content of the filler is from 30 parts by mass to 70 parts by mass per 100 parts by mass of the rubber component.

8. The rubber composition according to claim 1, wherein the filler is at least one selected from carbon black and an inorganic filler.

9. The rubber composition according to claim 1, wherein the 1,2-vinyl bond content in the polybutadiene is at most 20%.

10. A tire using the rubber composition of claim 1.

11. A method for producing the rubber composition of claim 1, comprising a step of kneading a rubber component containing a polybutadiene and a dienic rubber or an olefinic rubber immiscible with the polybutadiene, and a filler;
wherein the polybutadiene to be used is one having a Mooney viscosity ($ML_{1+4}$/100° C.) not smaller than that of the dienic rubber or the olefinic rubber immiscible with the polybutadiene.

12. The method for producing the rubber composition according to claim 11, wherein the polybutadiene is a modified polybutadiene.

13. The method for producing the rubber composition according to claim 11, wherein the Mooney viscosity ($ML_{1+4}$/100° C.) of the dienic rubber or the olefinic rubber immiscible with the polybutadiene is from 45 to 75.

* * * * *